(12) United States Patent
Leonard et al.

(10) Patent No.: US 8,645,970 B1
(45) Date of Patent: Feb. 4, 2014

(54) METHOD TO ROUTE NOTIFICATIONS TO DESIGNATED RESPONDER

(75) Inventors: Mark Leonard, Olathe, KS (US); Brian John Washburn, Kansas City, KS (US); Kailash Krishnamurthy, Lenexa, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 1617 days.

(21) Appl. No.: 11/854,342

(22) Filed: Sep. 12, 2007

(51) Int. Cl.
*G06F 9/44* (2006.01)
*G06F 19/00* (2011.01)

(52) U.S. Cl.
USPC .......................................... 719/314; 700/108

(58) Field of Classification Search
USPC ........................................................ 719/314
See application file for complete search history.

(56) References Cited

U.S. PATENT DOCUMENTS

| | | | |
|---|---|---|---|
| 6,760,580 B2* | 7/2004 | Robinson et al. | 455/412.2 |
| 7,725,577 B2* | 5/2010 | Nochta et al. | 709/224 |
| 2002/0170954 A1* | 11/2002 | Zingher et al. | 235/375 |
| 2004/0176864 A1* | 9/2004 | Cocco et al. | 700/108 |
| 2007/0168874 A1* | 7/2007 | Kloeffer et al. | 715/764 |

* cited by examiner

*Primary Examiner* — Andy Ho
*Assistant Examiner* — Abdou Seye

(57) ABSTRACT

A method for looking up routing information for a person or program assigned to respond to an incident messages is explained herein. The method includes recognizing a routing code that was appended to either the object name or description. The routing code is recognized by a program that looks up the responders contact information in a table that correlates routing codes with designated responder information.

12 Claims, 5 Drawing Sheets

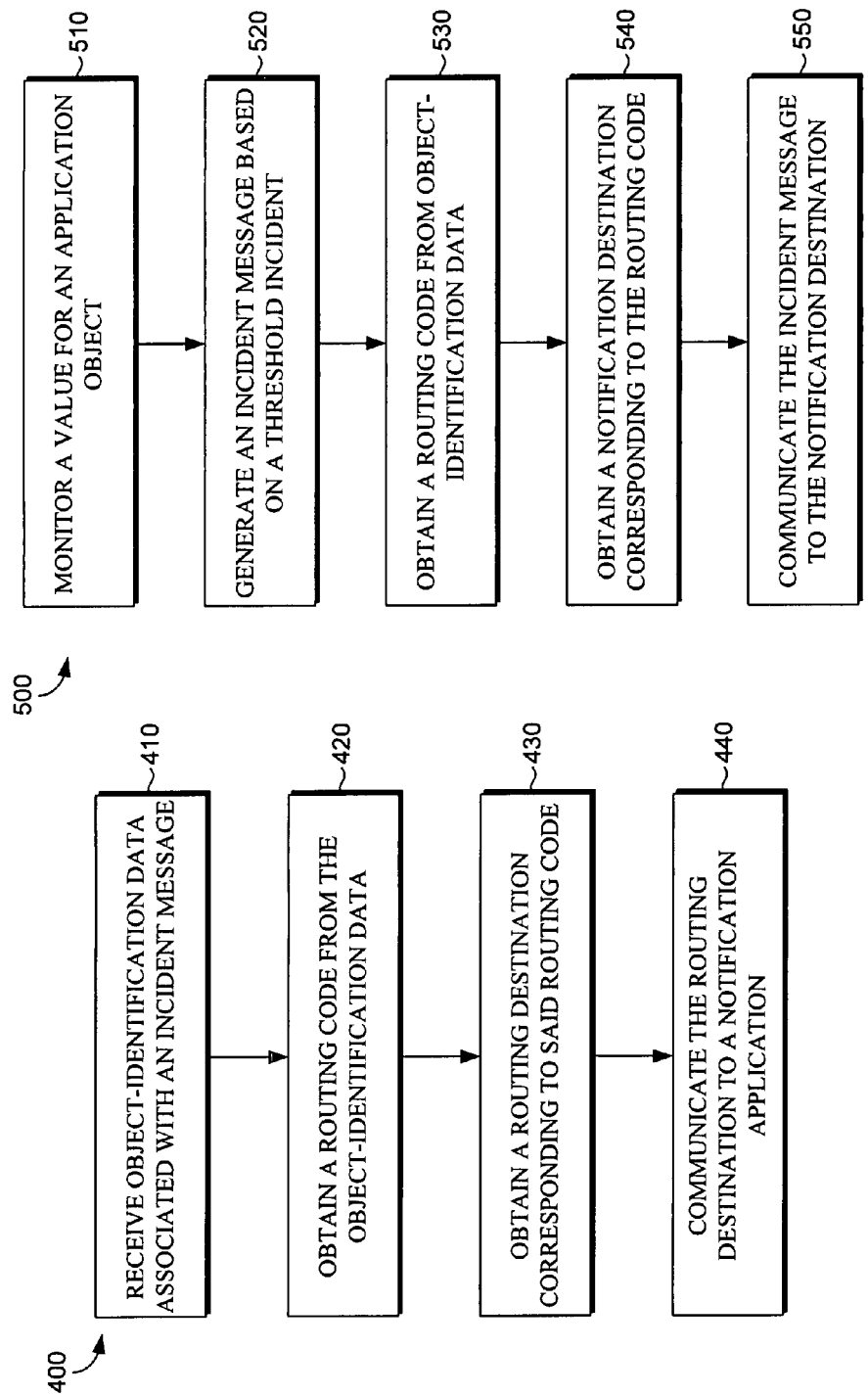

METHOD TO ROUTE NOTIFICATIONS TO DESIGNATED RESPONDER

CROSS-REFERENCE TO RELATED APPLICATIONS

Not applicable.

SUMMARY OF THE INVENTION

The present invention is defined by the claims below. Embodiments of the present invention provide a system and method for routing an incident message to a designated responder. Embodiments of the present invention have several practical applications in the technical arts including routing incident messages generated by a monitoring application to a designated responder. Specifically, the present invention eliminates the need to store and update responder contact information on an individual object basis.

In a first illustrative embodiment, object-identification data associated with an incident message is received. The object-identification data contains a routing code. The routing code is obtained from the object-identification data and used to obtain a routing destination that corresponds to the routing code from a data store. Finally, the routing destination is communicated to a notification application.

In another illustrative embodiment, a value within a messaging-middleware object is monitored. An incident message is generated when the value within the object crosses a preset threshold. Next, a routing code is obtained from an object-identification field and used to obtain a routing destination for a designated responder that corresponds to the routing code. The routing destination is obtained from a data store. Finally, the incident message is communicated to the routing destination.

In a third illustrative embodiment, a queue name or a queue description associated with an incident message is obtained. A routing code is obtained from the queue name or the queue description. Finally, a routing destination that corresponds to the routing code is stored.

BRIEF DESCRIPTION OF THE SEVERAL VIEWS OF THE DRAWINGS

FIG. 4 is a flow chart showing a method of routing an incident message to one or more designated responders;

FIG. 5 is a flow chart showing a method that utilizes routing codes included in object-identification data to route incident messages.

DETAILED DESCRIPTION OF THE INVENTION

Figure 1:
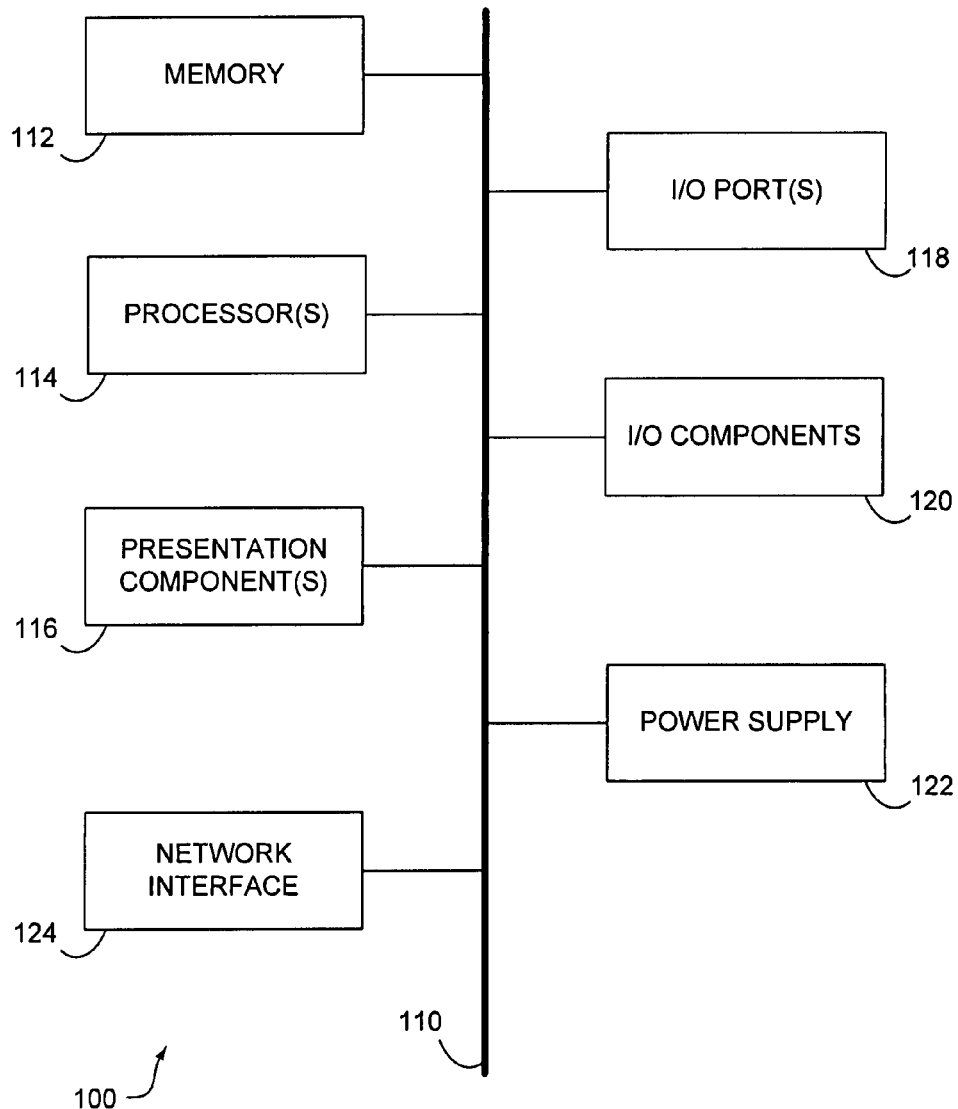
FIG. 1 is a block diagram of an operating environment suitable for use in implementing the present invention.

The present invention will be better understood from the detailed description provided below and from the accompanying drawings of various embodiments of the invention, which describe, for example, media for routing an incident message to a designated responder. The detailed description and drawings, however, should not be read to limit the invention to the specific embodiments. Rather, these specifics are provided for explanatory purposes that help the invention to be better understood.

In an embodiment of the present invention, object-identification data, such as the object name or description, associated with an incident message is received. A routing code is included in the object-identification data in accordance with a routing code protocol that enables the present invention to recognized the routing code. The routing code is then used to look up the routing destination for the designated responder in a data store that correlates routing codes and routing destinations. In a preferred embodiment, a centralized consolidated database is kept that correlates routing codes with designated responder information. In this manner, an incident message for the object is able to be routed to the correct designated responder.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Exemplary Operating Environment

As stated above, the present invention may be embodied as, among other things: a method, system, or computer-program product that is implemented as software, hardware or a combination of the two, or as a computer-readable media having computer usable instructions embodied thereon. In these embodiments, the exemplary operating environment may be as simple as a single computing device. Examples of well-known computing devices that may be suitable for use with the invention include, but are not limited to, personal computers, server computers, hand-held or laptop devices, multiprocessor systems, microprocessor-based systems, set top boxes, programmable consumer electronics, network personal computers (PCs), minicomputers, and mainframe computers. All of these devices are well known to those having ordinary skill in the art, thus, are not described in detail herein.

More commonly, embodiments of the present invention will be practiced in a distributed computing environment where computing devices are communicatively interconnected through a local-area network (LAN) or a wide-area network (WAN) including the Internet.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal digital assistant (PDA) or other handheld device. Generally, program modules including routines, programs, objects, components, data structures, and the like, refer to code that performs particular tasks or implements particular abstract data types. Each module described herein may represent executable source code written in a well-known language, such as, for example, C, C++, C#, Java, or the like.

Embodiments described herein may be practiced in a variety of system configurations, such as, for example, computing device 100. Embodiments described herein may also be practiced in distributed computing environments where tasks are performed by remote-processing devices that are linked through a communications network. For example, a computing device 100 may communicate with a server to accomplish different aspects of the embodiments described herein.

With continued reference to FIG. 1, computing device 100 includes a bus 110 that directly or indirectly couples the following devices: memory 112, one or more processors 114, one or more presentation components 116, input/output ports 118, input/output components 120, an illustrative power supply 122, and a network connection 124. Bus 110 represents what may be one or more buses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an input/output (I/O) component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Network connection 124, allows the computing device to connect to a network. The network connection may be a modem, a network interface, a wireless connection or an optical fiber interface.

Figure 2:
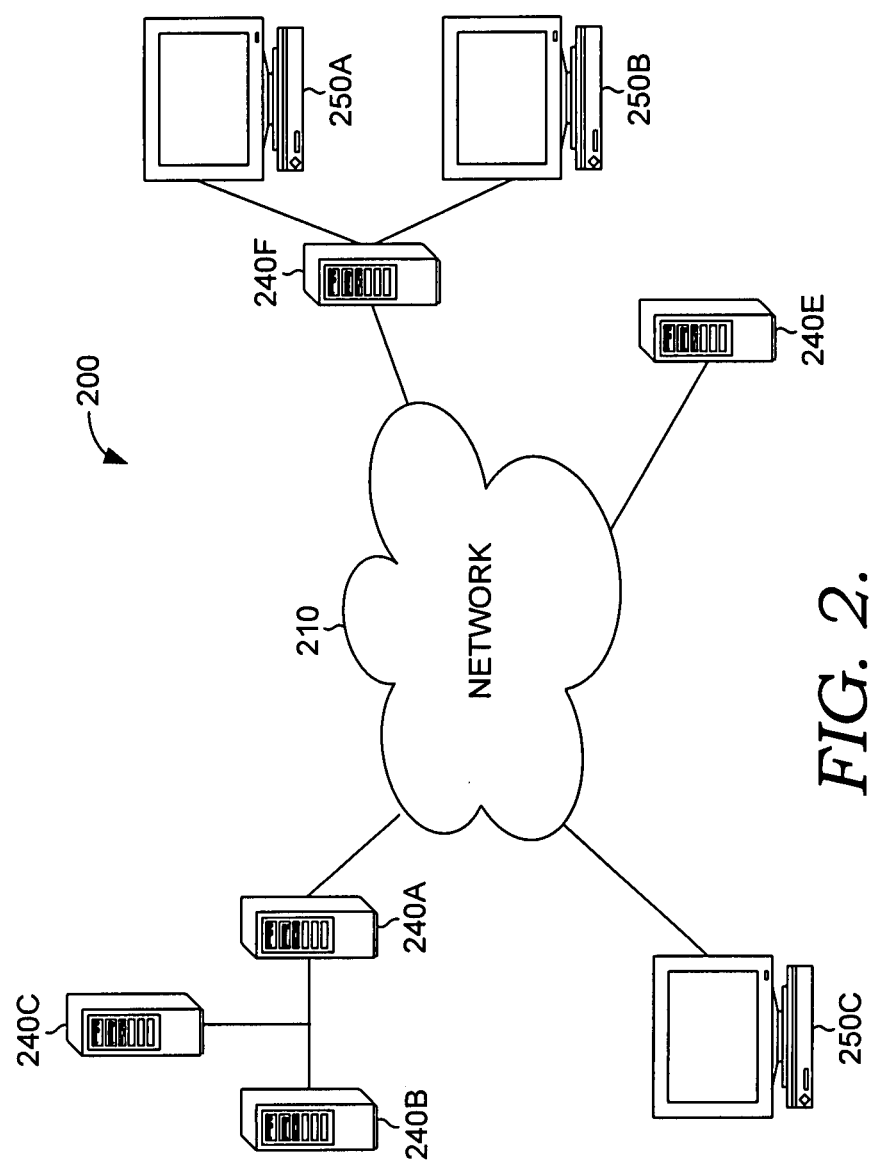
FIG. 2 is a block diagram of a second operating environment suitable for use in implementing the present invention.

Turning now to FIG. 2, a block diagram depicting a networking architecture 200 is shown for use in implementing an embodiment of the present invention in a distributed computing environment. The networking architecture 200 comprises client computing devices 250A, 250B, and 250C, servers 240A, 240B, 240C, 240E and 240F, all of which communicate with each other via network 210. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

The client computing devices 250A, 250B, and 250C may be a type of computing device, such as device 100 described above with reference to FIG. 1. By way of example only and not limitation, the client computing devices 250A, 250B, and 250C may be a personal computer, desktop computer, laptop computer, handheld device, cellular phone, consumer electronic, digital phone, smartphone, PDA, or the like. It should be noted that embodiments are not limited to implementation on such computing devices.

Network 210 may include a computer network or combination thereof. Examples of networks configurable to operate as network 210 include, without limitation, a wireless network, landline, cable line, digital subscriber line (DSL), fiber-optic line, local area network (LAN), wide area network (WAN), metropolitan area network (MAN), or the like. Network 210 is not limited, however, to connections coupling separate computer units. Rather, network 210 may also comprise subsystems that transfer data between servers or computing devices. For example, network 210 may also include a point-to-point connection, the Internet, an Ethernet, an electrical bus, a neural network, or other internal system. Furthermore, network 210 may include a WiMAX-enabled infrastructure (i.e., components that conform to IEEE 802.16 standards).

In an embodiment where network 210 comprises a LAN networking environment, components are connected to the LAN through a network interface or adapter. In an embodiment where network 210 comprises a WAN networking environment, components use a modem, or other means for establishing communications over the WAN, to communicate. In embodiments where network 210 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

Furthermore, network 210 may also include various components necessary to facilitate communication with a mobile phone (e.g., cellular phone, Smartphone, Blackberry®). Such components may include, without limitation, switching stations, cell sites, Public Switched Telephone Network interconnections, hybrid fiber coaxial cables, or the like.

The servers 240A-F may be a type of application server, database server, or file server configurable to perform the methods described herein. In addition, each of the servers 240A-F may be a dedicated or shared server. One example, without limitation, of a server that is configurable to operate as servers 240A-F is a PowerEdge® server manufactured by Dell, Inc. headquartered in Round Rock, Tex. The servers 240A-F may also be configured to run server software, such as SQL Server® 2005, which was developed by the Microsoft® Corporation of Redmond, Wash., or Apache HTTP Server Project, developed by the Apache Software Foundation.

Components of the servers 240A-F may include, without limitation, a processing unit, internal system memory, and a suitable system bus for coupling various system components, including one or more databases for storing information (e.g., files and metadata associated therewith). Each server may also include, or be given access to, a variety of computer-readable media. By way of example, and not limitation, computer-readable media may include computer-storage media and communication media. In general, communication media enables each server to exchange data via network 210. More specifically, communication media may embody computer-readable instructions, data structures, program modules, or any information-delivery media. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the servers 240A-F are illustrated as single boxes, one skilled in the art will appreciate that they are scalable. For example, the server 240D may in actuality include multiple boxes in communication as illustrated by servers 240A-C. The single unit depictions are meant for clarity, not to limit the scope of embodiments in any form.

Figure 3:
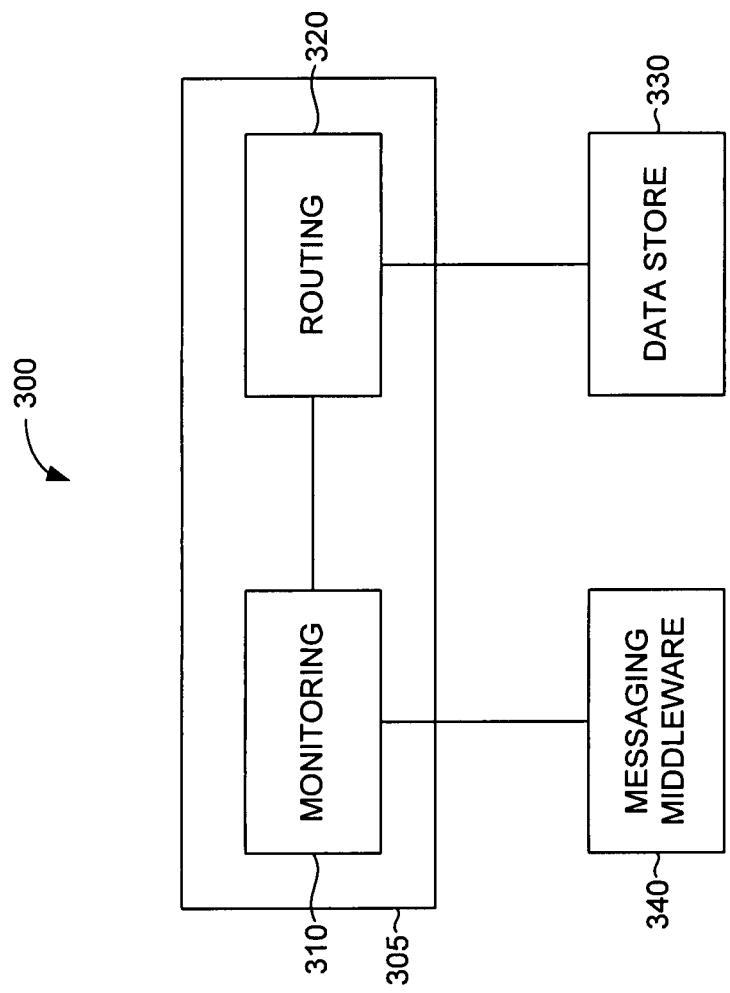
FIG. 3 is a system diagram of a computing environment suitable for implementing the present invention.

Turning now to FIG. 3, a system diagram illustrating a computing environment suitable for practicing the present invention is shown. The system 300 includes a monitoring application 310 and routing application 320 which are located on computing device 305. The monitoring application 310 is communicatively connected to a messaging middleware application 340. The routing application is communicatively connected to a data store 330.

Computing device 305 may be a computing device as described above with reference to FIG. 1. The messaging-middleware application 340 and data store 330 may also reside on computing device 305, or they may be dispersed on one or more computing device communicatively connected to computing device 305 as is shown. The messaging middleware application 340 and data store may reside on computing devices that are communicatively connected to computing device 305 by a network 210.

Messaging-middleware (a.k.a message-oriented middleware) applications are commonly used to transfer data between two or more separate applications. Examples of commercially available messaging-middleware applications include IBM's WebSphere® MQ (formerly MQ Series®), Fiorano's MQ, Oracle Advanced Queuing (AQ), and Microsoft's MSMQ. The messaging-middleware application 340 uses queues to transfer messages from one application to another. For example, application A may need to send a message to application B. The messages from application A is placed in a sending queue, within the messaging-middleware application 340, and transferred by the messaging-middleware application 340 into a receiving queue that is also within the messaging-middleware application 340. Program B then retrieves the message from the receiving queue. The message is transmitted through channels within the messaging-middleware application. The queues and channels are both examples of application objects. In this example, programs A or B could be located on any computing device communicatively connected to the one or more computing devices (not shown) on which the messaging-middleware application 340 is located. The messaging middleware application may reside on computing device 305, but may also operate on one or more other computing devices communicatively connected to computing device 305 through a network 210.

Monitoring application 310 monitors designated values within messaging-middleware objects, including channels and queues. Examples of commercially available monitoring applications include HP Openview®, Q Pasa!® by MQSoftware, Candle's PathWAI and BMC Patrol. The monitoring application 310 monitors the messaging-middleware objects for threshold events. A threshold event occurs when a monitored value within the object crosses a designated value. When a threshold event occurs, the monitoring application 310 generates a threshold incident message and transmits it to a designated responder. The designated responder may make changes to the object configuration to resolve the threshold incident. The designated responder is a person or program that is responsible for resolving the threshold event.

Routing application 320 may be a plug-in for the monitoring application 310 or otherwise work with the monitoring application 310. The routing application 320 identifies responder contact information so the monitoring application 310 may send an incident notification to the correct designated responder. The function of the routing application 320 will be explained in more detail with reference to FIGS. 4-6.

Data store 330 stores data structures that correlate routing destinations for designated responders with routing codes. The data store may reside on computing device 305, but may also be located on one or more other computing devices communicatively connected to computing device 305 through network 210.

More Precise Invention Aspect

With reference to FIG. 4, a method 400 of routing an incident message to one or more designated responders is shown. An incident message communicates that a monitored threshold for an object has been crossed. By way of example, and not limitation, a monitored threshold could be the data volume within an object. A designated responder is one or more people or programs that will evaluate the incident message and take corrective action if necessary. The incident message is generated by a monitoring application 310 that is monitoring application objects within a messaging-middleware application 340. The monitored object may be a queue in the messaging-middleware application 340. When the monitored object is a queue the monitoring application 310 monitors, at least, the data volume in the queue and generate an incident message when the data volume within the queue crosses a preset threshold.

At step 410, the routing application 320 receives object-identification data associated with an incident message. Every object is identified by object-identification data. Object-identification data includes, but is not limited to, the object name and object description. The object-identification data may be sent to the routing application 320 by the monitoring application 310. The monitoring application 310 may also send the entire incident message to the routing application 320. Every incident message includes object-identification data for the object associated with the incident message.

Thus, the routing application 320 could receive the object-identification data directly or as part of the incident message.

At step 420, the routing application 320 obtains the routing code from the object-identification data. The object-identification data includes a routing code that has been added apart from method 400 and prior to the threshold incident that caused the incident message to be generated. Method 400 requires that object-identification data, for objects within the monitoring application, be amended according to a routing code protocol. The routing code protocol assigns one routing code to a designated responder. The designated responder may be a single person, a group of people, or a computer program. If a designated responder is assigned to receive the incident notification for an object then the routing code corresponding to the designated responder is added to the object's identification data, such as the object name or object description. A table that correlates the routing codes with the routing destination for the designated responder is kept in data store 330. The same designated responder may be responsible for multiple objects. Therefore, the same routing code may be included in the object-identification data of more than one object.

The routing application 320 is aware of the routing code protocol so that the routing application may obtain the routing code from the object-identification data. Any variety of routing code protocols could be developed. The present invention is not limited by the routing code protocol that is used, other than requiring the routing code to be included in object-identification data. By way of example, the routing code protocol could be a group of numerals, or letters, or a combination of the two. In one embodiment, the routing code is appended to the start or end of the object name or object description.

At step 430, the routing application 320 obtains the routing destination using the routing code. The routing application obtains the routing destination from a data store 330 that correlates the routing codes with the routing destination. The data store 330 is configured to be updated to allow the addition of routing codes and changes to routing destinations. In one embodiment, the data store is a consolidated database. In a further preferred embodiment, the consolidated database correlates all of the routing codes with routing destinations for all monitored objects within an entity, such as a corporation.

At step 440, the routing destination is communicated to a notification application. The routing destination is a location where the designated responder receives the incident message. Different types of routing destinations are possible including a page, a voicemail box, text message address, phone number, or IP address. If the designated responder is another program then the routing destination may be a network address. Any type of location where a person or computer can be reaches would be an acceptable routing destination.

The notification application may be separate from the monitoring application 310 or it may be integrated with the monitoring application 310. The notification application then communicates the incident message to the designated responder using the supplied routing destination.

With reference to FIG. 5, a method that utilizes routing codes included in object-identification data to route incident messages is shown. The monitoring application 310 monitors designated values associated with an application object. When the value crosses a preset threshold the monitoring application generates an incident message for the object. The incident message includes a description of the threshold incident as well as identification data for the object. The incident message needs to be sent to a routing destination where a designated responder receives the incident message. The designated responder evaluates the incident message and takes corrective action if necessary. The monitoring application 310 uses the routing application 320 to determine the routing destination for the incident message.

At step 510, the monitoring application monitors values for an application object. The monitoring application may monitor objects within a messaging-middleware application 340. Further, the monitored object may be a queue in a the messaging-middleware application 340. When the monitored object is a queue, the value monitored may be the data volume in the queue.

At step 520, the monitoring application 310 generates an incident message if a monitored value crosses a preset threshold. In one embodiment, the incident message is generated when the data volume within a messaging-middleware queue 340 crosses a preset threshold value. An incident message may be generated when the threshold value crosses to alarm or crosses back to normal.

At step 530, the monitoring application 310 obtains the routing code from the object-identification data. The object-identification data includes a routing code that has been added apart from method 500 and prior to the threshold incident that caused the incident message to be generated. Method 500 requires that object-identification data, for objects within the monitoring application, be amended according to a routing code protocol. The routing code protocol assigns one routing code to a designated responder. The designated responder may be a single person, a group of people or a computer program. If a designated responder is assigned to receive the incident notification for an object then the routing code corresponding to the designated responder is added to the object's identification data, such as the object name or object description. A table that correlates the routing codes with the routing destination for the designated responder is kept in data store 330. The same designated responder may be responsible for multiple objects. Therefore, the same routing code may be included in the object-identification data of more than one object.

The routing application 320 is aware of the routing code protocol so that the routing application may obtain the routing code from the object-identification data. Any variety of routing code protocols could be developed. The present invention is not limited by the routing code protocol that is used, other than requiring the routing code to be included in object-identification data. By way of example, the routing code protocol could be a group of numerals, or letters, or a combination of the two. In one embodiment, the routing code is appended to the start or end of the object name or object description.

At step 540, the routing application 320 obtains the routing destination using the routing code. The routing destination is a location where the designated responder receives the incident message. Different types of routing destinations are possible, including a page, a voicemail box, text message address, phone number, or IP address. If the designated responder is another program then the routing destination may be a network address. Any type of location where a person or computer can be reaches would be an acceptable routing destination.

The routing application 320 obtains the routing destination from a data store 330 that correlates the routing codes with the routing destination. The data store 330 is configured to be updated to allow the addition of routing codes and changes to routing destinations. In a preferred embodiment, the data store 330 is a consolidated database. In a further preferred embodiment, the consolidated database correlates all of the routing codes with routing destinations for all monitored objects within an entity, such as a corporation.

At step 550, the incident message is communicated to the routing destination. The monitoring application 310 initiated the communication to the designated responder. The communication may be in the form of a page, email, voicemail, or phone call text message. If the designated responder is another application then the incident message is communicated in a digital format that is recognized by the receiving application.

Figure 6:
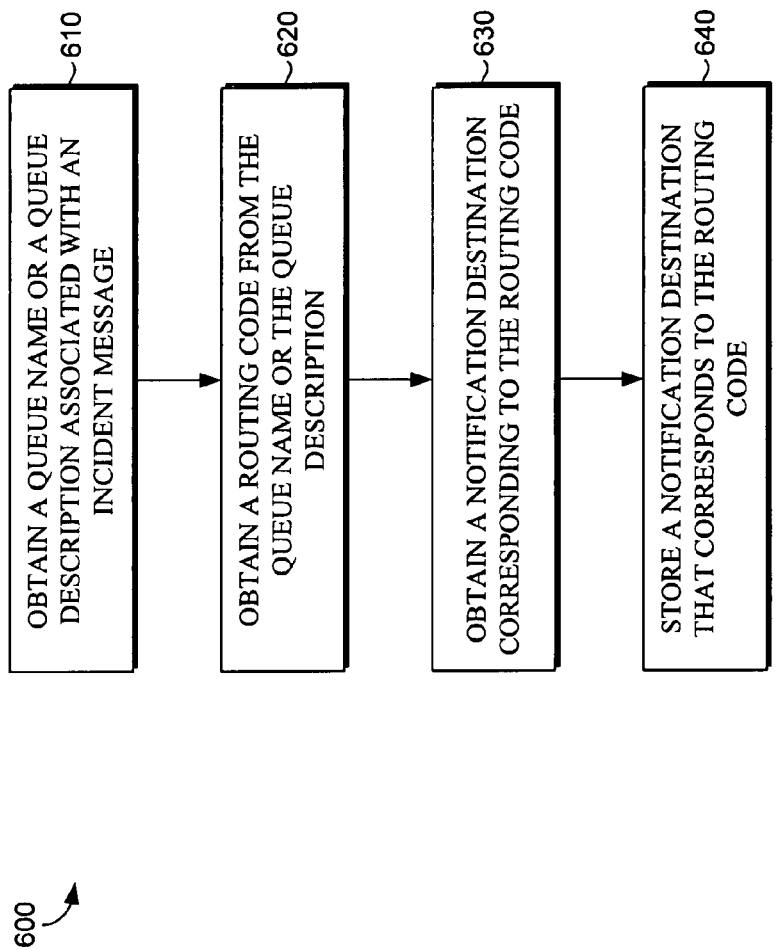
FIG. 6 is a flow chart showing a method to route an incident message for a messaging-middleware queue.

With reference to FIG. 6. a method 600 to route an incident message for a messaging-middleware queue is disclosed. The monitoring application 310 monitors queues within a messaging-middleware application and generates an incident message if the data volume within the queue crosses a preset threshold. The incident message includes a description of the threshold incident as well as queue-identification data. The incident message needs to be sent to a routing destination where a designated responder may receive the incident message. The designated responder evaluates the incident message and takes corrective action if necessary.

At step 610, the routing application 320 receives queue-identification data associated with an incident message. Every queue is identified by queue-identification data. Queue-identification data includes, but is not limited to, the queue name and queue description. The queue-identification data may be sent to the routing application 320 by the monitoring application 310. The monitoring application 310 may also send the entire incident message to the routing application 320. Every incident message includes queue-identification data for the object associated with the incident message. Thus, the routing application 320 could receive the queue-identification data directly or as part of the incident message.

At step 620, the routing application 320 obtains the routing code from the queue-identification data. The queue-identification data includes a routing code that has been added apart from method 600 and prior to the threshold incident that caused the incident message to be generated. Method 600 requires that queue-identification data, for queues within the monitoring application, be amended according to a routing code protocol. The routing code protocol assigns one routing code to a designated responder. The designated responder may be a single person, a group of people or a computer program. If a designated responder is assigned to receive the incident notification for a queue then the routing code corresponding to the designated responder is added to the queue's identification data, such as the queue name or queue description. A table that correlates the routing codes with the routing destination for the designated responder is kept in data store 330. The same designated responder may be responsible for multiple queue. Therefore, the same routing code may be included in the queue-identification data of more than one queue.

The routing application 320 is aware of the routing code protocol so that the routing application may obtain the routing code from the queue-identification data. Any variety of routing code protocols could be developed. The present invention is not limited by the routing code protocol that is used, other than requiring the routing code to be included in queue-identification data. By way of example, the routing code protocol could be a group of numerals, or letters, or a combination of the two. In one embodiment, the routing code is appended to the start or end of the queue name or queue description.

At step 630, the routing application 320 obtains the routing destination using the routing code. The routing destination is a location where the designated responder receives the incident message. Different types of routing destinations are possible, including a page, a voicemail box, text message address, phone number, or IP address. If the designated responder is another program then the routing destination may be a network address. Any type of location where a person or computer can be reaches would be an acceptable routing destination.

The routing application obtains the routing destination from a data store 330 that correlates the routing codes with the routing destination. The data store 330 is configured to be updated to allow the addition of routing codes and changes to routing destinations. In one embodiment, the data store is a consolidated database. In a further preferred embodiment, the consolidated database correlates all of the routing codes with routing destinations for all monitored queues within an entity, such as a corporation.

At step 640, the routing destination is stored for subsequent use. Possible subsequent uses include transmitting the incident message, or transmitting the routing destination to a separate application that may transmit the incident message.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-readable storage media having instructions embodied thereon for performing a method of determining a correct destination for an incident message generated by a monitoring application for a messaging-middleware environment program, the method comprising:
   receiving object-identification data for a messaging-middleware queue that is a subject of an incident message that warns that an alarm condition has been detected within the messaging-middleware queue;
   obtaining a routing code from a name of the messaging-middleware queue, wherein the routing code is appended to the name of the messaging-middleware queue and other messaging-middleware queues within the messaging-middleware environment;
   obtaining, from a look up table, a page-out group corresponding to said routing code from a data store, wherein the page-out group comprises one or more designated responders tasked with responding to the alarm condition;
   communicating the page-out group to a notification application that sends the incident message to the page-out group; and
   communicating the incident message to an application utility that is also associated with the routing code; wherein the application utility is configured to take an automated action in response to the incident message.

2. The media of claim 1, wherein the queue is a receiving queue within a messaging middleware program.

3. A computer-readable storage media with instructions embodied thereon for performing a method of routing an incident message to a designated responder, the method comprising:

monitoring a value associated with a queue in a messaging-middleware program;

generating an incident message when the value crosses a preset threshold;

obtaining a routing code from an object-identification data for the queue, wherein the object-identification data uniquely identifies the queue, and wherein the routing code is also associated with a name of the messaging-middleware queue other messaging-middleware queues within a messaging-middleware environment;

determining a page-out group corresponding to said routing code and a routing destination for the designated responder by looking up the page-out group and the routing destination that corresponds to the routing code in a data store;

communicating said incident message to said routing destination;

communicating the page-out group to a notification application that sends the incident message to the page-out group; and communicating the incident message to an application utility that is also associated with the routing code; wherein the application utility is configured to take an automated action in response to the incident message.

4. The media of claim 3, wherein the value includes data volume of the queue.

5. The media of claim 3, wherein the object-identification data comprises at least one of an queue name and an queue description.

6. The media of claim 5, wherein the routing code is appended to the at least one of the queue name and the queue description.

7. The media of claim 3, wherein the data store comprises a database that relates the routing code to at least one designated responder.

8. The media of claim 7, wherein the database comprises all of the routing codes and the designated responders for an entity utilizing the messaging-middleware program.

9. A computer readable storage media with instructions embodied thereon for performing a method of identifying a destination for an incident message related to an object, the method comprising:

obtaining at least one of a queue name and a queue description, wherein the queue name and queue description are both associated with a queue for which the incident message was generated;

obtaining a routing code from at least one of the queue name and the queue description, wherein the routing code is part of at least one of the queue name and the queue description, and wherein the routing code is also part of other messaging-middleware a queue name or a queue description for other queues within a messaging-middleware environment;

determining a page-out group corresponding to said routing code and a routing destination for a designated responder by looking up the page-out group and the routing destination that corresponds to the routing code in a data store;

communicating the page-out group to a notification application that sends the incident message to the page-out group; and communicating the incident message to an application utility that is also associated with the routing code; wherein the application utility is configured to take an automated action in response to the incident message.

10. The media of claim 9, further comprising facilitating communication of the incident message to the routing destination.

11. The media of claim 9, wherein the queue is a receiving queue within a messaging-middleware program.

12. The media of claim 9, wherein the incident message communicates that a data volume within the queue crossed a preset threshold.

* * * * *